US011639625B2

(12) United States Patent
Chi-Hsueh et al.

(10) Patent No.: US 11,639,625 B2
(45) Date of Patent: May 2, 2023

(54) HINGE SYSTEM OF ELECTRIC DOOR

(71) Applicants: Richard Chi-Hsueh, San Diego, CA (US); Li-Pai Chen, New Taipei (TW); Chung-Yeh Hsu, New Taipei (TW); Yie-Yeh Hsu, New Taipei (TW)

(72) Inventors: Richard Chi-Hsueh, San Diego, CA (US); Chung-Yeh Hsu, New Taipei (TW); Yie-Yeh Hsu, New Taipei (TW)

(73) Assignees: Richard Chi-Hsueh, San Diego, CA (US); Chung-Yeh Hsu, New Taipei (TW); Yie-Yeh Hsu, New Taipei (TW); Li-Pai Chen, New Taipei (TW)

(*) Notice: Subject to any disclaimer, the term of this patent is extended or adjusted under 35 U.S.C. 154(b) by 1127 days.

(21) Appl. No.: 16/265,407

(22) Filed: Feb. 1, 2019

(65) Prior Publication Data

US 2019/0376332 A1 Dec. 12, 2019

Related U.S. Application Data

(60) Provisional application No. 62/757,693, filed on Nov. 8, 2018, provisional application No. 62/681,104, filed on Jun. 6, 2018.

(51) Int. Cl.
*E05F 15/00* (2015.01)
*E05F 15/614* (2015.01)
(Continued)

(52) U.S. Cl.
CPC .......... *E05F 15/614* (2015.01); *G06F 1/1681* (2013.01); *G07C 9/00563* (2013.01);
(Continued)

(58) Field of Classification Search
CPC ... E05F 15/614; E05F 2015/765; E05F 15/73; G06F 1/1681; G07C 9/00563;
(Continued)

(56) References Cited

U.S. PATENT DOCUMENTS 6,481,160 B1 * 11/2002 Kowalczyk ........... E05F 15/643
49/335
6,751,909 B2 * 6/2004 Ranaudo .............. G05B 19/042
49/506
(Continued)

FOREIGN PATENT DOCUMENTS

CN 204357245 U 5/2015
CN 104179793 B 3/2017
(Continued)

*Primary Examiner* — Jerry E Redman
(74) *Attorney, Agent, or Firm* — Rosenberg, Klein & Lee

(57) ABSTRACT

The present invention relates to a hinge system of an electric door comprising a control module, an intelligent automatic recognition system for installing in a door or a door frame and including a recognition device and a sensing module, and a hinge assembly. The hinge assembly comprises a pivot housing, a power unit disposed in the pivot housing and electrically connected to the control module, a first hinge member having a first knuckle for sleeving on the pivot housing and a second hinge member connected to two ends of the pivot housing. The power unit comprises a motor assembly having a motor axis, a reduction gearbox having one end connected to the motor axis, a gear shaft and plural planetary gears, and a gear connected to the gear shaft of the reduction gearbox.

10 Claims, 10 Drawing Sheets

(51) Int. Cl.
*G06F 1/16* (2006.01)
*G07C 9/00* (2020.01)

(52) U.S. Cl.
CPC ..... *E05Y 2201/72* (2013.01); *E05Y 2900/132* (2013.01); *E05Y 2900/606* (2013.01); *G07C 9/00571* (2013.01)

(58) Field of Classification Search
CPC ............ G07C 9/00571; E05Y 2201/72; E05Y 2900/132; E05Y 2900/606; E05D 2003/027; E05D 3/02
USPC ........................................... 49/333, 334, 335
See application file for complete search history.

(56) References Cited

U.S. PATENT DOCUMENTS

| | | | | |
|---|---|---|---|---|
| 7,367,161 B1* | 5/2008 | Jones | .................... | E05F 15/614 49/334 |
| 8,169,169 B2* | 5/2012 | Hass | ........................ | E05F 15/63 361/84 |
| 8,261,491 B2* | 9/2012 | Yulkowski | .............. | E05F 15/63 49/300 |
| 8,653,982 B2* | 2/2014 | Yulkowski | .............. | E05F 15/00 73/493 |
| 8,671,620 B2* | 3/2014 | Bourget | ................. | E05F 15/614 49/334 |
| 8,844,200 B2* | 9/2014 | Yulkowski | ............ | E05F 15/603 49/31 |
| 9,879,465 B2* | 1/2018 | Elie | ......................... | E05F 15/60 |
| 11,072,964 B2* | 7/2021 | Teta | ........................ | E05F 1/006 |
| 11,428,039 B2* | 8/2022 | Docksteader | .............. | E05F 1/12 |
| 2013/0205670 A1* | 8/2013 | Springborn | ........... | E05F 15/614 49/358 |
| 2018/0142507 A1* | 5/2018 | Murphy | ..................... | E05F 5/08 |
| 2018/0283078 A1* | 10/2018 | Damboragama | ..... | E05F 15/614 |
| 2019/0085606 A1* | 3/2019 | Teta | ....................... | E05F 1/1207 |
| 2019/0364244 A1* | 11/2019 | Siminoff | ................ | G08B 25/10 |
| 2019/0376332 A1* | 12/2019 | Chi-Hsueh | ......... | G07C 9/00563 |
| 2019/0390503 A1* | 12/2019 | Teta | ....................... | E05F 1/1207 |
| 2020/0177051 A1* | 6/2020 | Abe | ......................... | E05D 11/00 |
| 2021/0025215 A1* | 1/2021 | Sellinger | ................. | E05F 15/63 |
| 2022/0263297 A1* | 8/2022 | Bodurka | .................. | H02G 3/04 |

FOREIGN PATENT DOCUMENTS

| | | | | |
|---|---|---|---|---|
| DE | 102020109532 B3 * | 2/2021 | | |
| EP | 3763907 A1 * | 1/2021 | ......... | E05D 11/1078 |

\* cited by examiner

HINGE SYSTEM OF ELECTRIC DOOR

BACKGROUND OF THE INVENTION

1. Field of the Invention

The present invention relates to a hinge system of an electric door which has small volume and high torque and is convenient in use.

2. Description of Related Art

Hinge is a mechanical device for connecting and spinning two objects relatively and is applied to doors, windows or cabinets. A hinge applied to an electric door or an electric window is usually used together with a power unit, e.g., a motor, for driving the hinge. The China Pat. No. CN104179793 (B), issued on 29 Mar. 2017, disclosed an electric hinge comprising a fixing member and a rotary member. The rotary member is relatively rotated to the fixing member by a pivot of the fixing member. The electric hinge is further provided with an electric driver connected to a first interlocking member, and the pivot passes through a second interlocking member. After electrified, the electric driver drives the first interlocking member to rotate the second interlocking member, the pivot and the rotary member. The China Pat. No. CN 204357245 (U), issued on 27 May 2015, disclosed an electric positioning hinge comprising a hinge, a hydraulic post, a motor and a fixing plate. The hydraulic post and the motor are disposed in a hinge shaft, and the motor is connected to one end of the hydraulic post by an output shaft. When the motor is turned on, the hydraulic post is driven by the motor to further drive a spiral sleeve disposed at the other end thereof so as to drive the rotation of the hinge by a transmission gear engaged with the spiral sleeve.

To drive a heavy object, an increased torque of an electric hinge is required. For instance, a high-powered power member can increase the torque of the hinge. However, the high-powered power member has a large volume, so the whole electric hinge having the high-powered power member for installing on a door also takes more space and is not convenient in use.

SUMMARY OF THE INVENTION

The present invention provides a hinge system of an electric door which comprises a control module, an intelligent automatic recognition system and a hinge assembly.

The intelligent automatic recognition system is electrically connected to the control module for installing in a door or outside a door frame, and comprises a sensing module and a recognition device.

The hinge assembly comprises a pivot housing, a power unit, a first hinge member and a second hinge member. The pivot housing has an interior space, a first connection portion disposed at one end of the pivot housing, a second connection portion disposed at the other end of the pivot housing, a first bushing sleeved on the first connection portion and a second bushing sleeved on the second connection portion. A diameter of the first connection portion and a diameter of the second connection portion are both less than a diameter of the pivot housing. The power unit is disposed in the interior space of the pivot housing and electrically connected to the control module. The power unit comprises a motor assembly, a reduction gearbox and a gear. The motor assembly has a motor axis and connected to one end of the reduction gearbox, and the gear is connected to the other end of the reduction gearbox. The first hinge member comprises a first hinge leaf and a first knuckle connected to the first hinge leaf. The first knuckle is a hollow tube and sleeved on the pivot housing. The second hinge member comprises a second hinge leaf, a second knuckle connected to one end of the second hinge leaf and a third knuckle connected to the other end of the second hinge leaf. The second knuckle and the third knuckle are sleeved on the first bushing and the second bushing respectively for connecting the second hinge member to the pivot housing.

According to an embodiment of the present invention, the reduction gearbox comprises a seat, a planetary gear assembly, a planetary gear housing, a cap and a bearing. The seat is connected to the motor assembly by one side thereof and has a first through hole for an insertion of the motor axis. The planetary gear assembly is connected to the seat and the motor axis by one side thereof and comprises a gear shaft and plural planetary gears. The planetary gear assembly is sleeved by the planetary gear housing, and the planetary gear housing is connected to the seat by one end thereof. The cap has a perforation and covers the other end of the planetary gear housing. The bearing is disposed in the perforation of the cap and has a second through hole for an insertion of the gear shaft of the planetary gear assembly.

According to an embodiment of the present invention, the pivot housing has a fixing segment in a middle region thereof and two circular embossing regions at two ends of the fixing segment respectively. The fixing segment and the two circular embossing regions are sleeved by the first knuckle of the first hinge member.

According to an embodiment of the present invention, the fixing segment of the pivot housing is provided with plural first locking holes, the motor assembly and the reduction gearbox are provided with plural second locking holes corresponding to the plural first locking holes, and the first knuckle is provided with plural third locking holes corresponding to the plural first locking holes and the plural second locking holes.

According to an embodiment of the present invention, the pivot housing is provided with a first positioning portion at a junction of the pivot housing and the first connection portion and a second positioning portion at a junction of the pivot housing and the second connection portion respectively, and each of the first positioning portion and the second positioning portion is sleeved with a cushion.

According to an embodiment of the present invention, a power supply is further provided and is electrically connected to the power unit.

According to an embodiment of the present invention, the first hinge leaf is provided with at least one fourth locking hole, and the second hinge leaf is provided with at least one fifth locking hole.

According to an embodiment of the present invention, the second hinge member is provided with a gear sleeve accommodated in the second knuckle and has at least one positioning groove at a periphery thereof and plural first slots corresponding to the gear of the power unit for sleeving the gear tightly by the plural first slots, the second knuckle is further provided with at least one a positioning rod corresponding to the at least one positioning groove of the gear sleeve for positioning.

According to an embodiment of the present invention, an outer end of the second knuckle is provided with a first knuckle cap, and an outer end of the third knuckle is provided with a second knuckle cap.

According to an embodiment of the present invention, the recognition device comprises at least one of a fingerprint recognition module, a voice recognition module, an image recognition module and a password recognition module, and the sensing module comprises at least one of an infrared sensor and a laser sensor.

Accordingly, the hinge system of an electric door of the present invention can monitor an approach of a user and opens or closes a door by controlling the hinge assembly installed on the door after identifying the user by the recognition device. The hinge assembly of the present invention comprises the motor assembly and the reduction gearbox which are made integrally, so the hinge assembly has a small volume and is convenient in use. In addition, the reduction gearbox comprises the plural planetary gears which increase torque of the hinge assembly and decrease noises generated during operation.

DETAILED DESCRIPTION OF THE PREFERRED EMBODIMENT

To provide a thorough understanding, the purpose and advantages of the present invention will be described in detail with reference to the accompany drawings.

Figure 1:
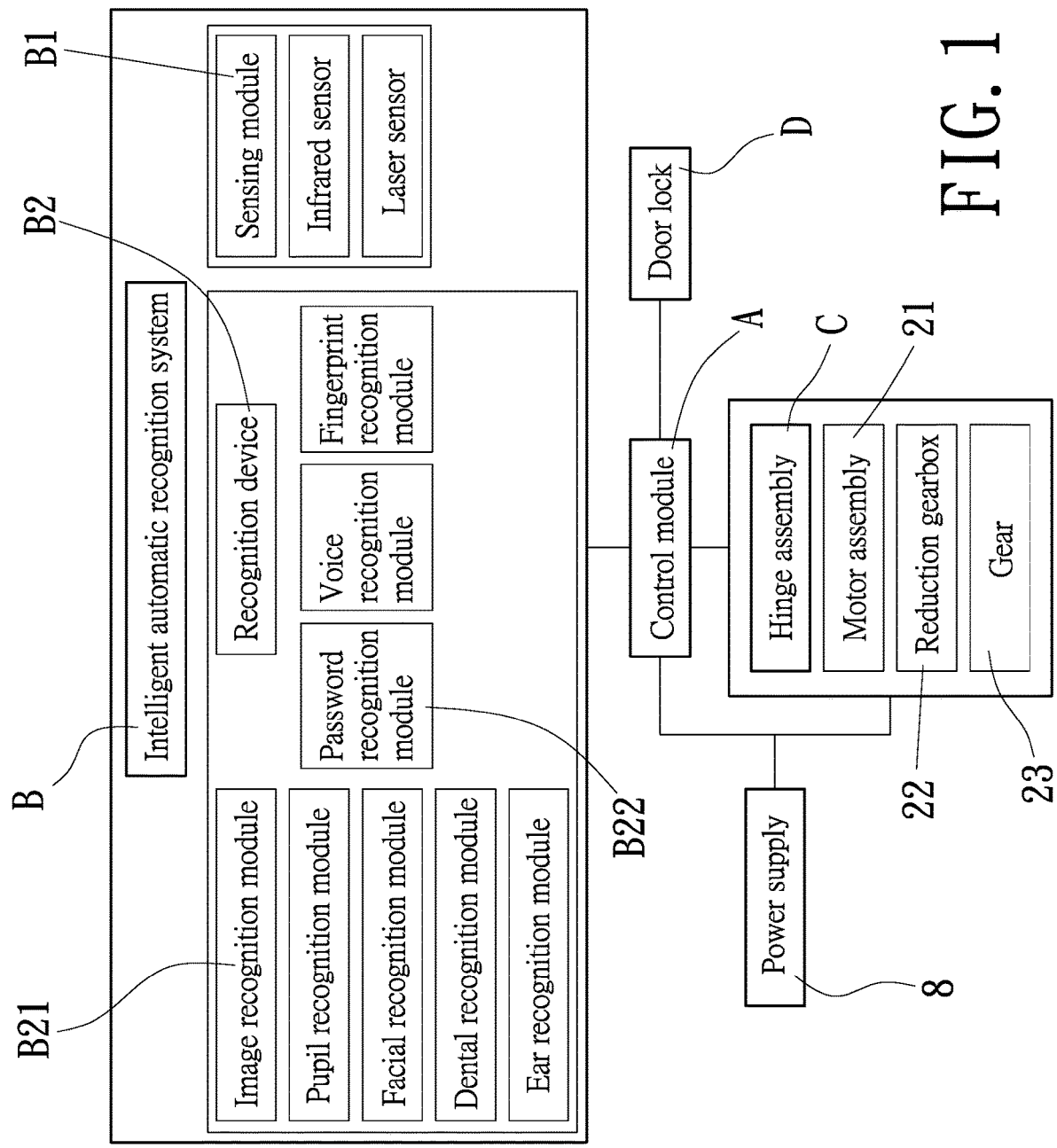
FIG. 1 is a block diagram showing a hinge system of an electric door of the present invention.
Figure 2:
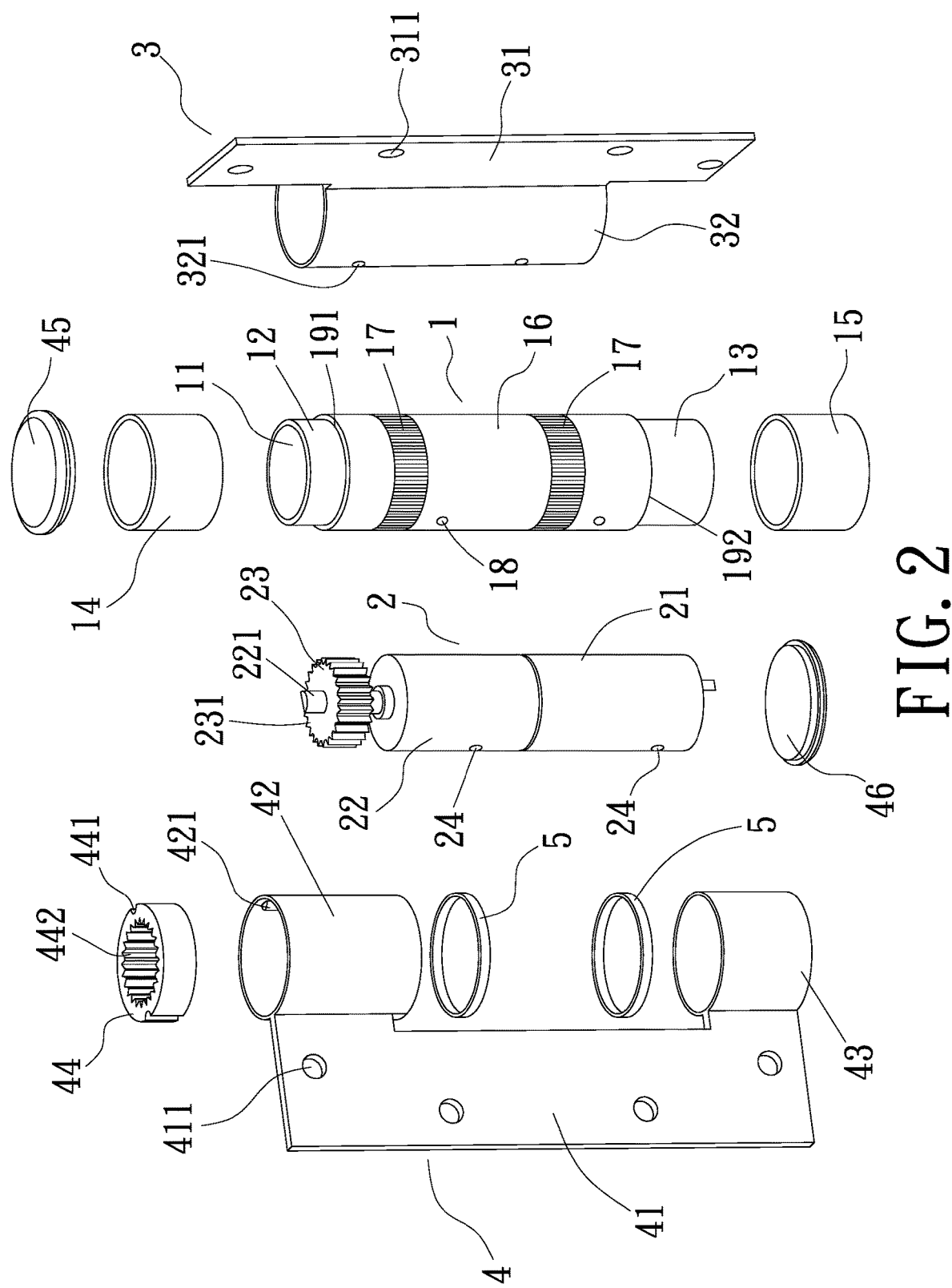
FIG. 2 is a first exploded diagram showing a hinge assembly of a hinge system of an electric door of the present invention.

Referring to FIG. 1, the hinge system of electric door of the present invention comprises a control module (A), an intelligent automatic recognition system (B) and a hinge assembly (C).

The intelligent automatic recognition system (B) is electrically connected to the control module (A) and has a sensing module (B1) and a recognition device (B2). The sensing module (B1) comprises at least one of an infrared sensor and a laser sensor. The recognition device (B2) comprises at least one of a fingerprint recognition module, a voice recognition module, a password recognition module and an image recognition module. The image recognition module comprises at least one of a pupil recognition module, a facial recognition module, a dental recognition module and an ear recognition module.

Referring to FIG. 2, FIG. 3, FIG. 4 and FIG. 5, the hinge assembly (C) comprises a pivot housing (1), a power unit (2), a first hinge member (3) and a second hinge member (4).

The pivot housing (1) comprises an interior space (11), a first connection portion (12) disposed at one end of the pivot housing (1), a second connection portion (13) disposed at the other end of the pivot housing (1), a first bushing (14) sleeved on the first connection portion (12), and a second bushing (15) sleeved on the second connection portion (13). A diameter of the first connection portion (12) and a diameter of the second connection portion (13) are both less than a diameter of the pivot housing (1). In one embodiment of the present invention, the pivot housing (1) has a fixing segment (16) in a middle region and two circular embossing regions (17) at two ends of the fixing segment (16) respectively, and the fixing segment (16) of the pivot housing (1) is provided with plural first locking holes (18).

The power unit (2) is disposed in the interior space (11) and comprises a motor assembly (21), a reduction gearbox (22) and a gear (23). The reduction gear box (22) is connected to the motor assembly (21) by one end and has a gear shaft (221) at the other end for connecting to the gear (23). The motor assembly (21) and the reduction gearbox (22) are provided with plural second locking holes (24) corresponding to the first locking holes (18) of the pivot housing (1). A locking member is passed through the first locking hole (18) and the second locking hole (24) for fixing the power unit (2) in the pivot housing (1).

The first hinge member (3) comprises a first hinge leaf (31) and a first knuckle (32) connected to the first hinge leaf (31). The first knuckle (32) is shaped as a hollow tube and sleeved on the pivot housing (1). The first knuckle (32) is provided with plural third locking holes (321) corresponding to the plural first locking holes (18) and the plural second locking holes (24) for assembling and fixing the pivot housing (1), the power unit (2) and the first hinge member (3). In an embodiment, the fixing segment (16) and the two circular embossing regions (17) of the pivot housing (1) are sleeved by the first knuckle (32) of the first hinge member (3), and the first knuckle (32) is anchored to the fixing segment (16) of the pivot housing (1) by the two circular embossing regions (17). In addition, the first hinge leaf (31) is provided with at least one fourth locking hole (311).

The second hinge member (4) comprises a second hinge leaf (41), a second knuckle (42) connected to one end of the second hinge leaf (41) and a third knuckle (43) connected to the other end of the second hinge leaf (41). The second knuckle (42) and the third knuckle (43) are sleeved on the first bushing (14) and the second bushing (15) of the pivot housing (1) respectively to connect the second hinge member (4) to the pivot housing (1) for assembling the hinge assembly (C). The first bushing (14) and the second bushing (15) are made of a wear-resistant material so as to make the second knuckle (42) and the third (43) move coaxially and precisely, and the second hinge member (4) is rotated smoothly relative to the first hinge member (3). The first bushing (14) and the second bushing (15) also prevent a tilted and shaking state when rotating, and reduce noise generation from the hinge assembly (C). The second hinge leaf (41) is provided with at least one fifth locking hole (411). Furthermore, the pivot housing (1) is provided with a first positioning portion (191) at a junction of the pivot housing (1) and the first connection portion (12) and a second positioning portion (192) at a junction of the pivot housing (1) and the second connection portion (13) respectively. Each of the first positioning portion (191) and the second positioning portion (192) is sleeved with a cushion (5). After assembling, the two cushions (5) are disposed at two terminals of the first knuckle (32) of the first hinge member (3), and are disposed at intervals between the second knuckle (42) and the first knuckle (32), and the third knuckle (43) and the first knuckle (32). The two cushions (5) prevent a direct contact and friction of the first knuckle (32) with the second knuckle (42) and the third knuckle (43).

Figure 3:
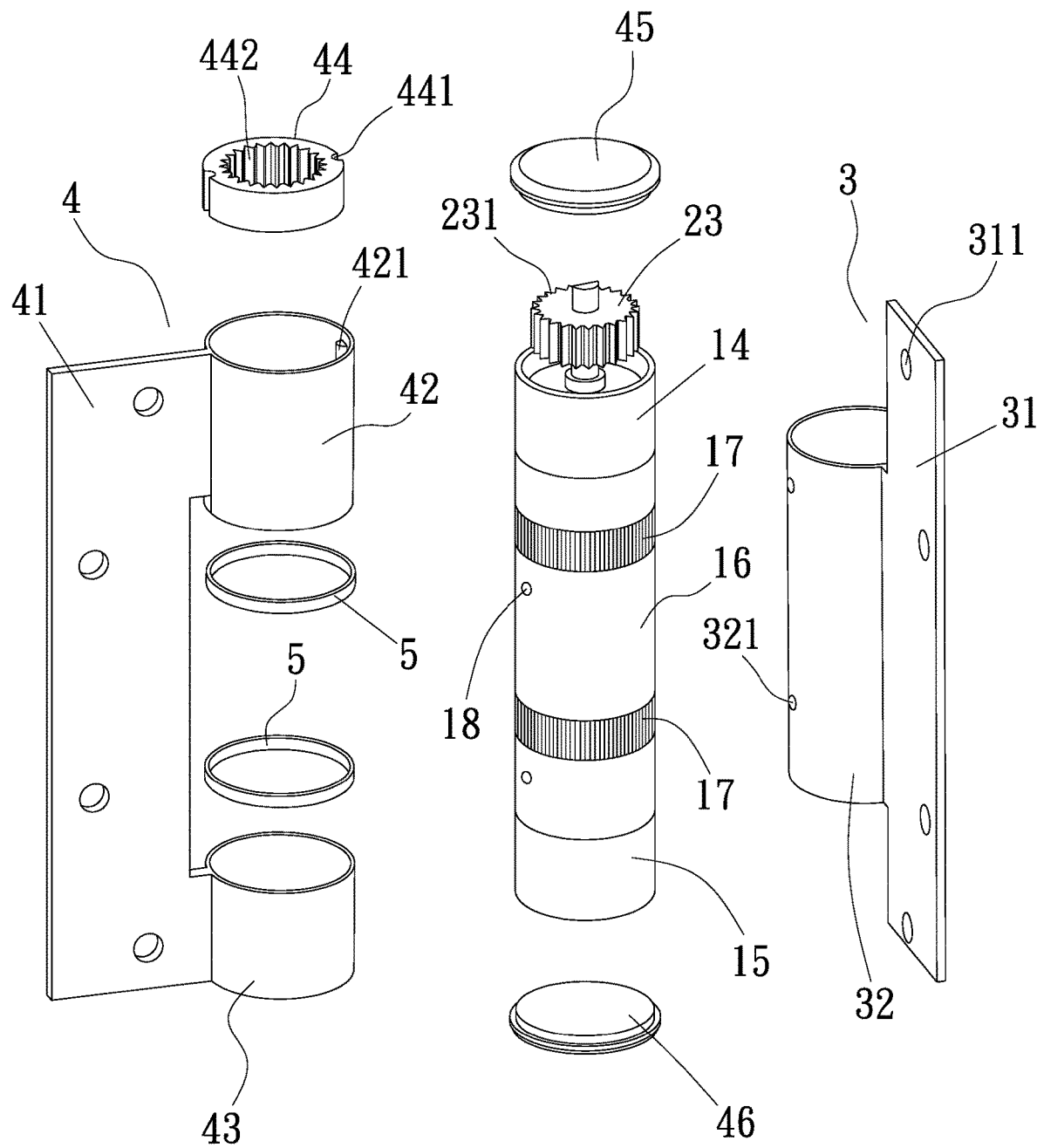
FIG. 3 is a second exploded diagram showing a hinge assembly of a hinge system of an electric door of the present invention.
Figure 4:
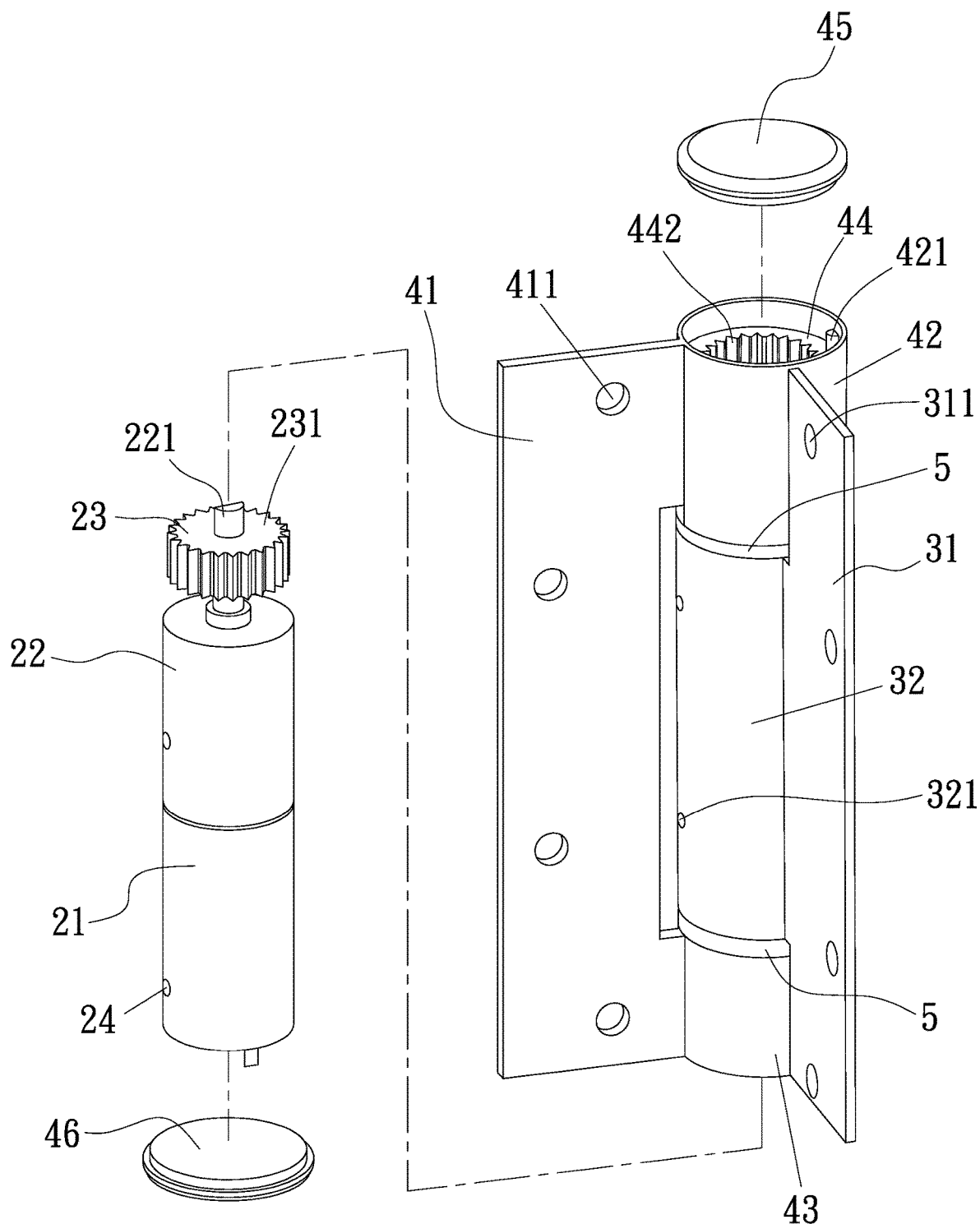
FIG. 4 is a third exploded diagram showing a hinge assembly of a hinge system of an electric door of the present invention.
Figure 5:
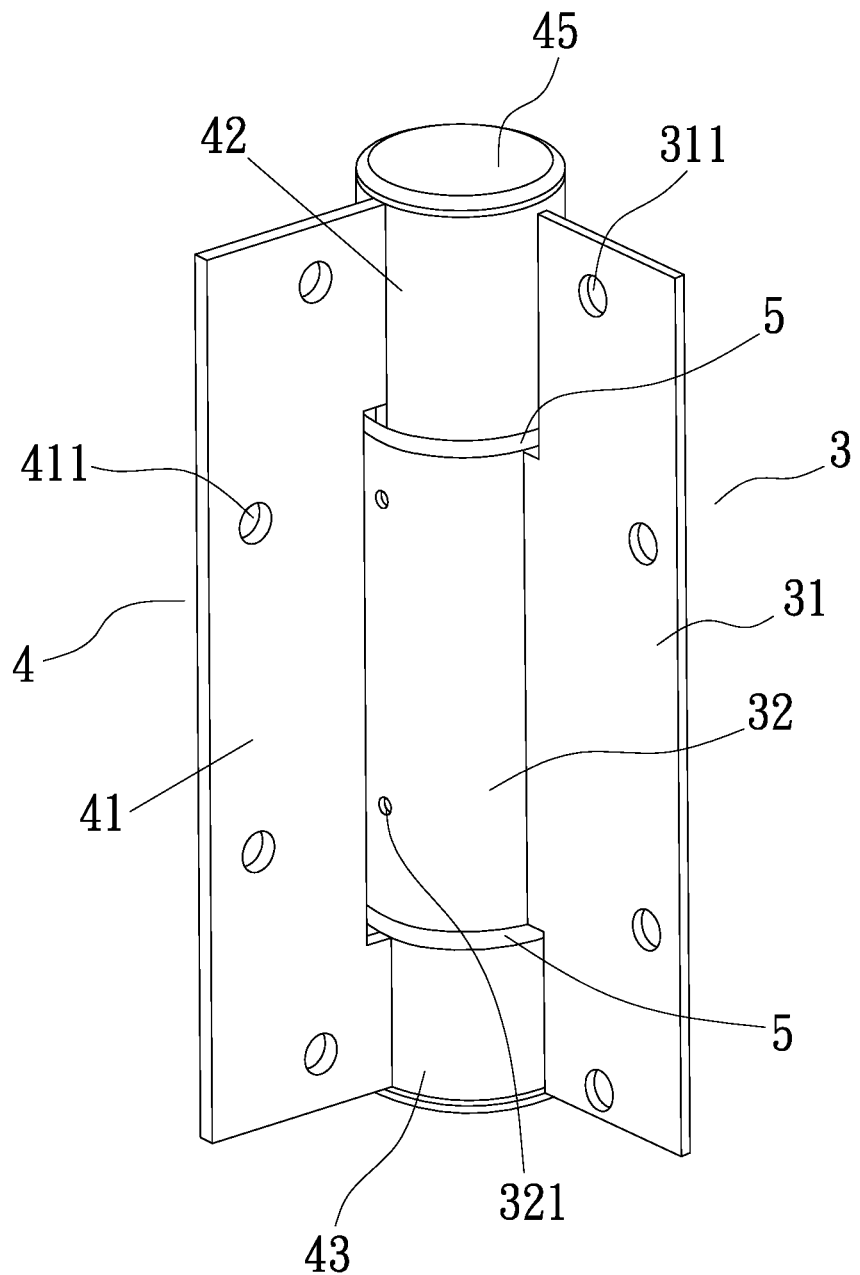
FIG. 5 is a stereogram showing a hinge assembly of the present invention in assembly.

Referring to FIG. 3 and FIG. 4, the second hinge member (4) is provided with a gear sleeve (44) accommodated in the second knuckle (42). The gear sleeve (44) has at least one positioning groove (441) at a periphery, and the second knuckle (42) is provided with at least one positioning rod (421) corresponding to the at least one positioning groove (441) of the gear sleeve (44) for positioning the gear sleeve (44). The gear sleeve (44) is further provided with plural first slots (442) corresponding to plural teeth (231) of the gear (23) of the power unit (2) for sleeving the gear (23) tightly. An outer end of the second knuckle (42) is provided with a first knuckle cap (45), and an outer end of the third knuckle (43) is provided with a second knuckle cap (46) to complete assembling of the hinge assembly (C) which is shown in FIG. 5.

Figure 6:
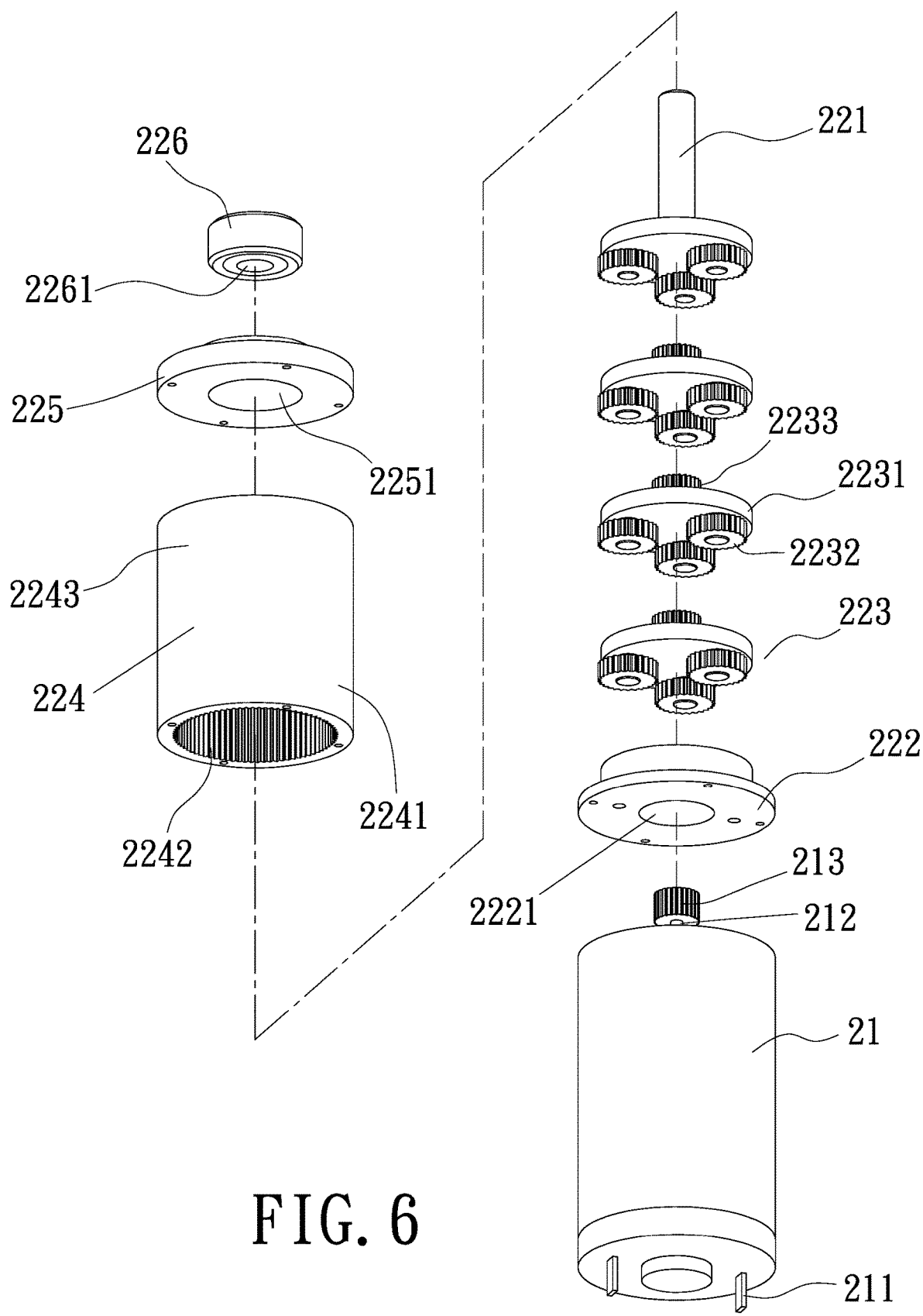
FIG. 6 is an exploded diagram showing a power unit of the present invention.
Figure 7:
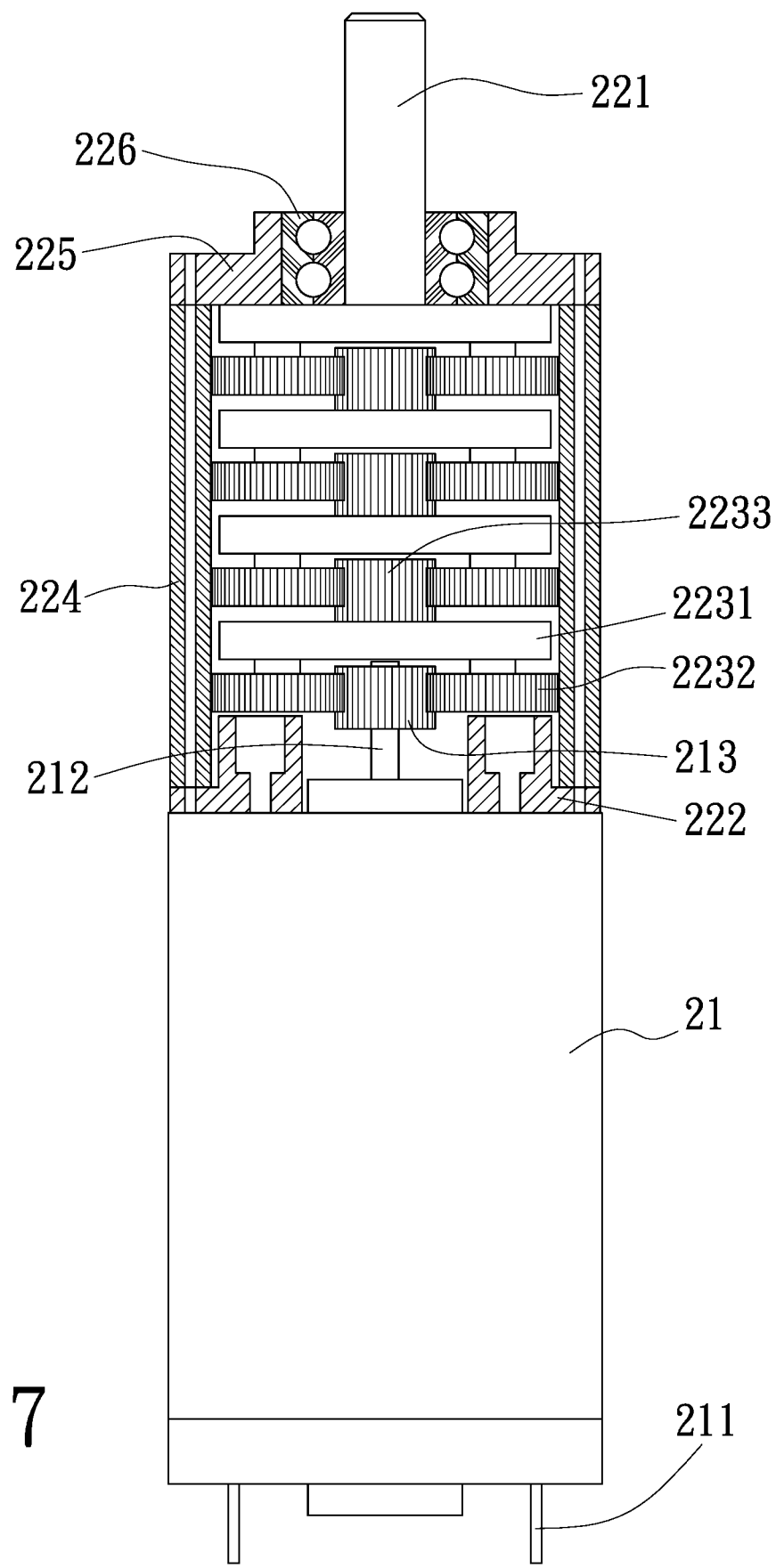
FIG. 7 is a sectional view showing a reduction gearbox of the present invention in use.

Referring to FIG. 6 and FIG. 7, the motor assembly (21) and the reduction gearbox (22) of the power unit (2) of the present invention is made integrally. The motor assembly (21) has a plug (211) at one side for connecting to a power source and providing power to the motor assembly (21), and a motor axis (212) connecting to an axis gear (213) disposed at the other side of the motor assembly (21).

The reduction gearbox (22) further comprises a seat (222) having one side connected to the motor assembly (21) and a first through hole (2221) and, a planetary gear assembly having plural planetary gears (223), a planetary gear housing (224), a cap (225) and a bearing (226). Each of the plural planetary gears (223) comprises a gear rack (2231) having a first surface and a second surface, plural outer gears (2232) disposed on the first surface arranging into a ring and an inner gear (2233) disposed at a middle region on the second surface. In the embodiment of FIG. 6 and FIG. 7, the gear rack (2231) has three outer gears (2232) on the first surface.

Referring to FIG. 6 and FIG. 7, when assembling, the motor axis (212) of the motor assembly (21) passes through the first through hole (2221) of the seat (222) and the axis gear (213) connected to the motor axis (212) is disposed between and engaged to the plural outer gears (2232) at the first surface of a planetary gear (223), and the inner gear (2233) disposed at a middle region of the second surface of the planetary gear (223) is engaged to the plural outer gears (2232) of another planetary gear (223); and plural planetary gears (223) are assembled according to the manner described above to form the planetary gear assembly. In one preferable embodiment, the planetary gear assembly comprises 3 or 4 sets of the planetary gear (223). In a planetary gear (223) disposed at an end of the reduction gearbox (22) opposite to the seat (222), the planetary gear (223) is provided with the gear shaft (221) at the second surface. After the plural planetary gears (223) are assembled to form the planetary gear assembly, the planetary gear housing (224) sleeves on the planetary gear assembly and connected to the seat (222) by one end (2241) of the planetary gear housing (224). An internal side of the planetary gear housing (224) is provided with plural second slots (2242) for engaging with the outer gears (2232) of the planetary gears (23); and at last, the cap (225) is covered at the other end (2243) of the planetary gear housing (224). The cap (225) has a perforation (2251), and the bearing (226) is disposed in the perforation (2251). The bearing (226) also has a second through hole (2261) in a middle region for an insertion of the gear shaft (221).

When the motor assembly (21) is turned on, the plural planetary gears (223) of the reduction gearbox (22) are driven by the axis gear (213) connected to the motor axis (212), then the gear (23) connected to the reduction gearbox (22) is driven by the reduction gearbox (22). The gear (23) further drives the second knuckle (42) of the second hinge member (4) to rotate relative to the first hinge member (3) by the gear sleeve (44) sleeved on the gear (23) and accommodated in the second knuckle (42). The design of the present invention can reduce the volume of the hinge assembly (C) and provide a high torque when using a lower rotation rate motor assembly.

Figure 8:
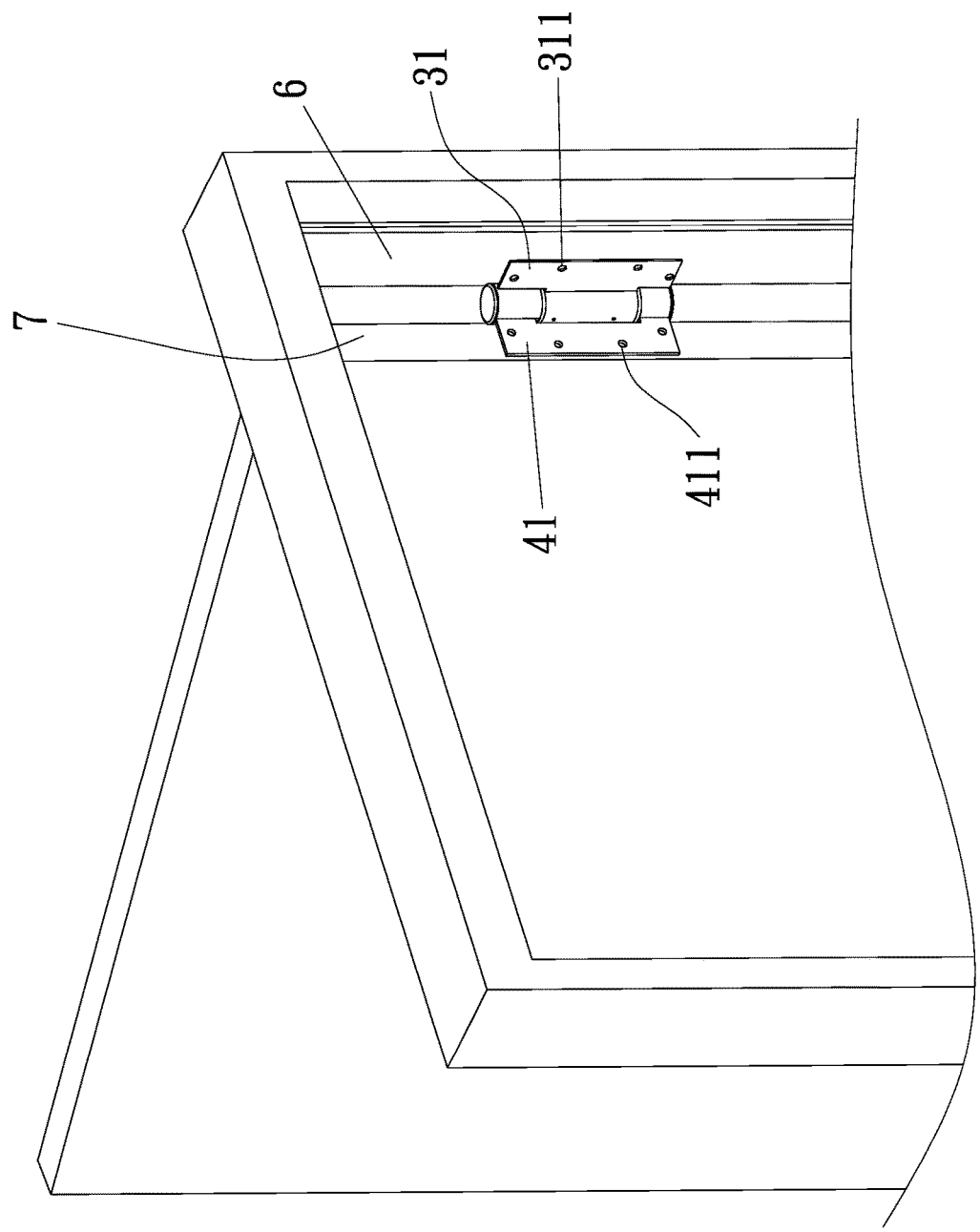
FIG. 8 is a first schematic diagram showing a hinge system of an electric door of the present invention in use.
Figure 9:
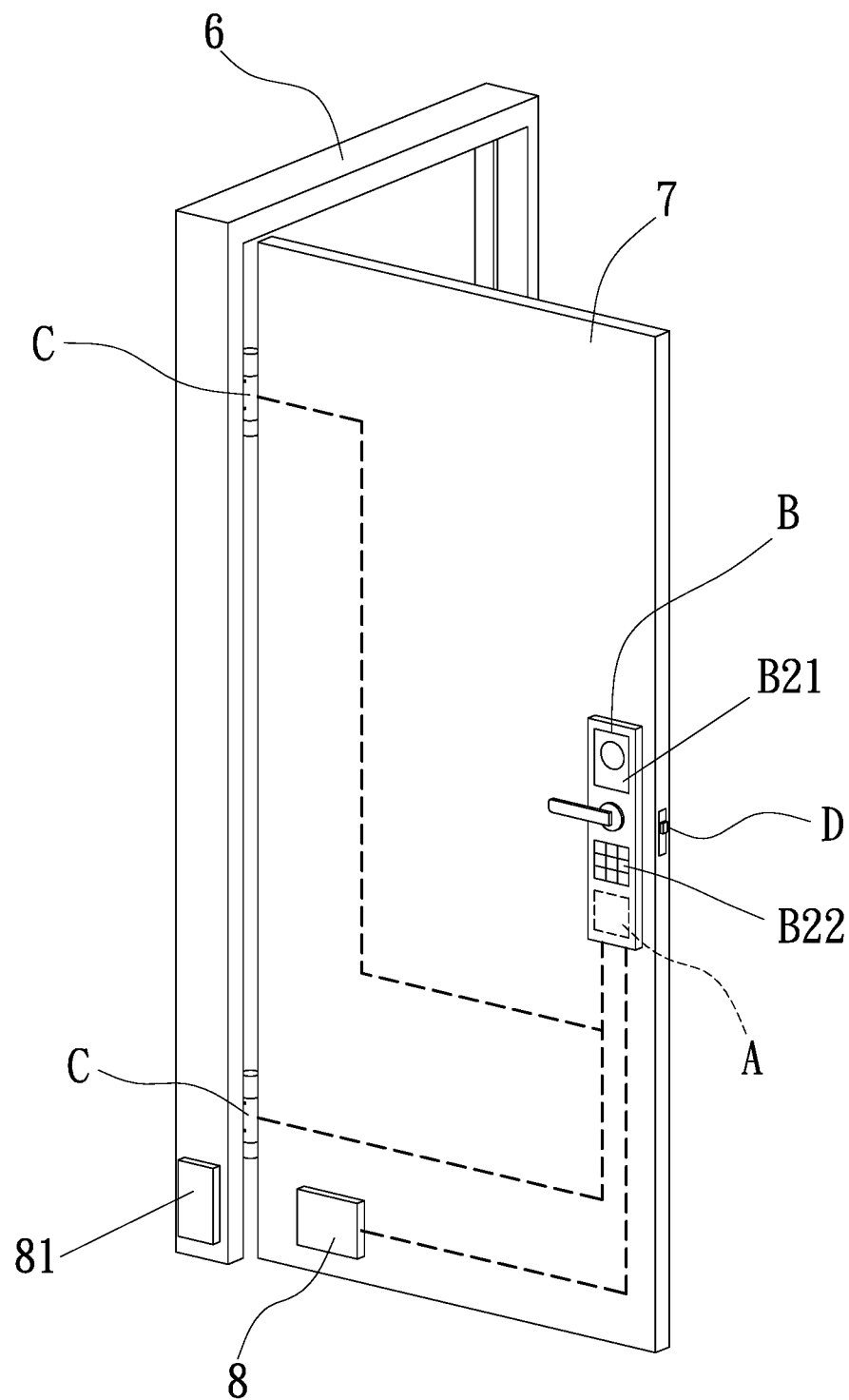
FIG. 9 is a second schematic diagram showing a hinge system of an electric door of the present invention in use.
Figure 10:
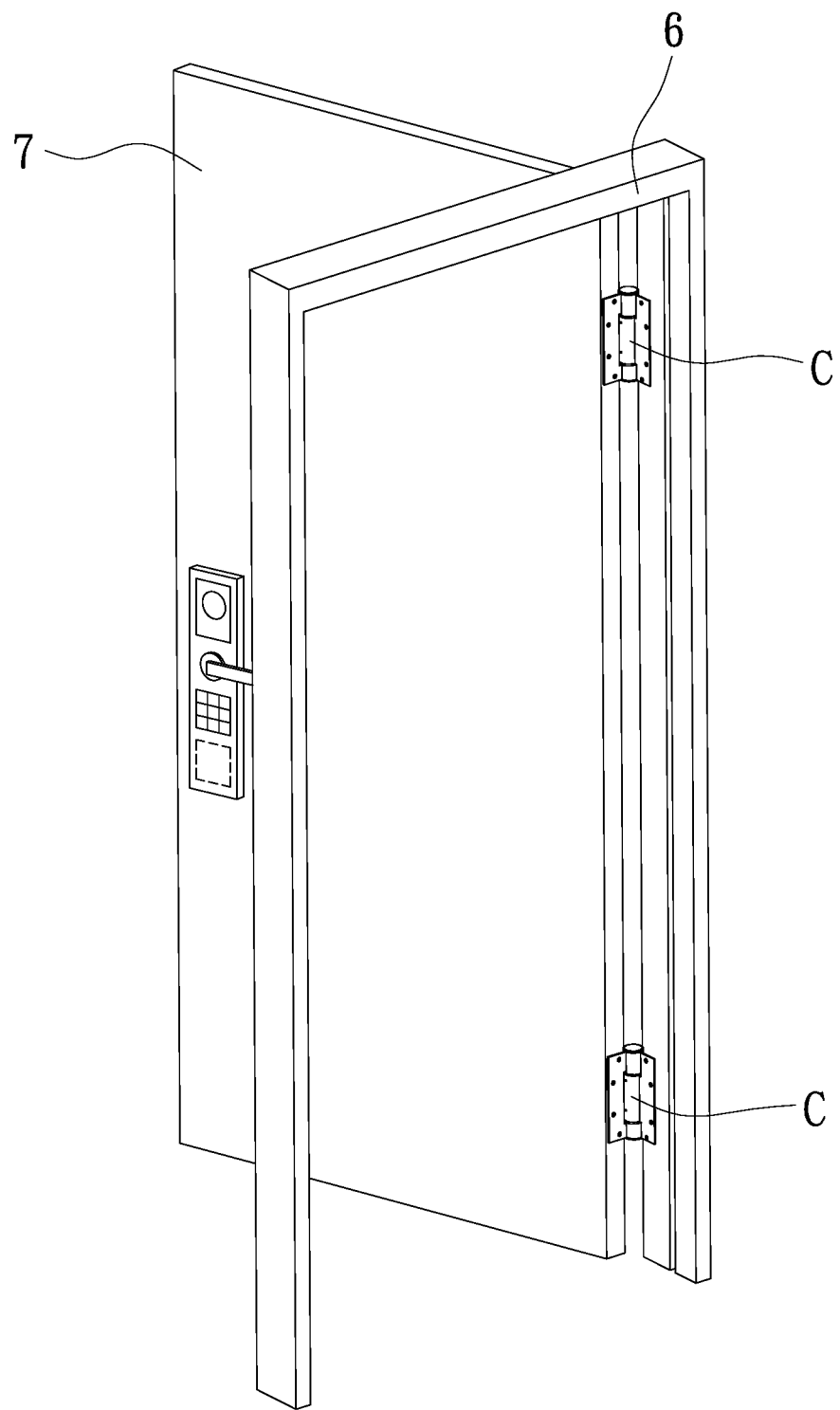
FIG. 10 is a third schematic diagram showing a hinge system of an electric door of the present invention in use.

Referring to FIG. 8, FIG. 9 and FIG. 10, when using the present invention, the first hinge leaf (31) of the first hinge member (3) is fixed to a door frame (6), e.g., the first hinge leaf (31) is fixed to the door frame (6) by a locking member passing through the fourth locking hole (311) and fixing to the door frame (6). The second hinge leaf (41) of the second hinge member (4) is fixed to a lateral side of a door (7), e.g., the second hinge leaf (41) is fixed to the lateral side of the door (7) by a locking member passing through the fifth locking hole (411) and fixing to the lateral of the door (7). At least one set of the hinge assembly (C) of the present invention is installed on the door (7) according to a user's requirement. In FIG. 8 to FIG. 10, two sets of the hinge assembly (C) and the intelligent automatic recognition system (B) are installed on the door (7). The recognition device (B2) used in the intelligent automatic recognition system (B) is also depends on the user's requirement. For instance, in the embodiment of FIG. 8 to FIG. 10, the recognition device (B2) comprises an image recognition module (B21) and a pass word recognition module (B22). And the control module is integrated with and electrically connected to the intelligent automatic recognition system (B). A power supply (8) for the present invention can be disposed inside the door (7), and a spare power supply (81) is further provided and disposed inside the door frame (6) for supplying electricity when the power supply (8) is malfunctioning. The power supply (8) and the spare power supply (81) are electrically connected to the control module (A), the intelligent automatic recognition system (B) and the hinge assembly (C). The sensing module (B1) of the intelligent automatic recognition system (B) can be installed on the door frame (6), the door (7) or other locations in according to a user's need. When a pedestrian approaching a door installed with the present invention, the sensing module (B1) senses the pedestrian and transmits this information to the control module (A), and the control module (A) unlocks a door lock (D) and drives the hinge assembly (C) rotate to open the door (7) for the pedestrian; after the pedestrian passing through the door (7), the control module (A) then drives the hinge assembly (C) rotate to close the door. The recognition device (B2) of the intelligent automatic recognition system (B) can be used to control personnel access. For instance, after being recognized by the image recognition module (B21), or entering a correct password to the password recognition module (B22), or recognized by a fingerprint recognition module or a voice recognition module, the control module (A) will receive the information from the recognition device (B2) and then unlocks the door lock (D) and drives the hinge assembly (C) to open the door (7).

Accordingly, the hinge system of electric door of the present invention comprises advantages below:

1. The power unit having the motor assembly and the reduction gearbox is made integrally to efficiently reduce the volume of the present invention; in addition, the reduction gearbox having plural planetary gears can increase torque of the hinge assembly so as to increase a loading capacity of the present invention, so the present invention can be applied on doors made of different materials such as a woody door or a metal door.

2. The plural planetary gears in the reduction gearbox decrease noises generated when the hinge assembly is working and has highly industrial value.

3. The present invention controls a movement of a door by the control module and the door is opened automatically after a user is recognized by the intelligent automatic system, so the user does not need to open the door by hands, so the present invention is convenient in use.

What is claimed is:

1. A hinge system of an electric door, comprising:
   a control module;
   an intelligent automatic recognition system electrically connected to the control module for being disposed in a door or outside a door frame and having a sensing module and a recognition device; and
   a hinge assembly comprising a pivot housing having an interior space, a first connection portion disposed at one end of the pivot housing with a smaller diameter than a diameter of the pivot housing, a second connection portion disposed at the other end of the pivot housing with a smaller diameter than the diameter of the pivot housing, a first bushing sleeved on the first connection portion and a second bushing sleeved on the second connection portion; a power unit disposed in the interior space for electrically connecting the control module and having a motor assembly having a motor axis, a reduction gearbox having one end connected to the motor axis and a gear connected to the other end of the reduction gearbox by a gear shaft; a first hinge member having a first hinge leaf and a first knuckle connected to the first hinge leaf and shaped as a hollow tube for sleeving the pivot housing; and a second hinge member having a second hinge leaf, a second knuckle connected to one end of the second hinge leaf for sleeving the first bushing, and a third knuckle connected to the other end of the second hinge leaf for sleeving the second bushing.

2. The hinge system of an electric door as claimed in claim 1, wherein the reduction gearbox comprises a seat having one side connected to the motor assembly and a first through hole for an insertion of the motor axis of the motor assembly, a planetary gear assembly connected to the seat and the motor axis by one side thereof and having the gear shaft and plural planetary gears, a planetary gear housing sleeved on the planetary gear assembly and connected to the seat by one end thereof, a cap having a perforation for covering the other end of the planetary gear housing, and a bearing disposed in the perforation of the cap and having a second through hole for an insertion of the gear shaft.

3. The hinge system of an electric door as claimed in claim 1, wherein the pivot housing has a fixing segment in a middle region thereof and two circular embossing regions at two ends of the fixing segment respectively, and wherein the fixing segment and the two circular embossing regions are sleeved by the first knuckle of the first hinge member.

4. The hinge system of an electric door as claimed in claim 3, wherein the fixing segment of the pivot housing is provided with a plurality of first locking holes, the motor assembly and the reduction gearbox are provided with a plurality of second locking holes corresponding to the first locking holes, and the first knuckle is provided with a plurality of third locking holes corresponding to the plurality of first locking holes and the plurality of second locking holes.

5. The hinge system of an electric door as claimed in claim 4, wherein the first hinge leaf is provided with at least one fourth locking hole, and the second hinge leaf is provided with at least one fifth locking hole.

6. The hinge system of an electric door as claimed in claim 1, wherein the pivot housing is provided with a first positioning portion at a junction of the pivot housing and the first connection portion and a second positioning portion at a junction of the pivot housing and the second connection portion respectively, and wherein each of the first positioning portion and the second positioning portion is sleeved with a cushion.

7. The hinge system of an electric door as claimed in claim 1, a power supply is further provided and electrically connected to the power unit.

8. The hinge system of an electric door as claimed in claim 1, wherein the second hinge member is provided with a gear sleeve accommodated in the second knuckle and having at least one positioning groove at a periphery thereof and plural first slots corresponding to the gear of the power unit for sleeving the gear, and wherein the second knuckle is further provided with at least one positioning rod corresponding to the at least one positioning groove of the gear sleeve for positioning.

9. The hinge system of an electric door as claimed in claim 1, wherein an outer end of the second knuckle is provided with a first knuckle cap, and an outer end of the third knuckle is provided with a second knuckle cap.

10. The hinge system of an electric door as claimed in claim 1, wherein the recognition device comprises at least one of a fingerprint recognition module, a voice recognition module, an image recognition module and a password recognition module, and the sensing module comprises at least one of an infrared sensor and a laser sensor.

* * * * *